(12) United States Patent
Perdec

(10) Patent No.: US 6,265,829 B1
(45) Date of Patent: Jul. 24, 2001

(54) MULTIPLEX LIGHT HARNESS

(75) Inventor: Roman Perdec, Burlington (CA)

(73) Assignee: The Louis Berkman Company, Steubenville, OH (US)

( * ) Notice: Subject to any disclaimer, the term of this patent is extended or adjusted under 35 U.S.C. 154(b) by 0 days.

(21) Appl. No.: 09/563,985

(22) Filed: May 3, 2000

Related U.S. Application Data

(63) Continuation of application No. 09/294,905, filed on Apr. 21, 1999, which is a continuation-in-part of application No. 09/232,238, filed on Jan. 19, 1999, now Pat. No. 6,153,975.

(51) Int. Cl.[7] .................................................. B60Q 1/02
(52) U.S. Cl. ............................................. 315/82; 307/10.8
(58) Field of Search ....................... 315/77, 82; 307/10.1, 307/10.8; 362/487, 498, 507, 543

(56) References Cited

U.S. PATENT DOCUMENTS

| | | |
|---|---|---|
| D. 243,274 | 2/1977 | Miceli . |
| D. 255,167 | 5/1980 | Hetrick . |
| D. 260,937 | 9/1981 | Hetrick . |
| D. 266,599 | 10/1982 | Suzuki . |
| D. 372,317 | 7/1996 | Kijima . |
| D. 372,995 | 8/1996 | Huang . |
| D. 376,661 | 12/1996 | Matthies . |
| D. 390,979 | 2/1998 | Yamamoto . |
| D. 390,980 | 2/1998 | Yamamoto . |
| D. 399,326 | 10/1998 | Kelly . |
| 4,280,062 | * 7/1981 | Miller et al. ................. 307/10 LS |
| 4,781,393 | 11/1988 | Jeter . |
| 5,083,933 | * 1/1992 | Collearn et al. .................... 439/357 |
| 5,193,894 | * 3/1993 | Lietar et al. ....................... 362/276 |
| 5,195,813 | * 3/1993 | Brown ................................ 315/77 |
| 5,420,480 | 5/1995 | Knepel . |
| 5,473,515 | * 12/1995 | Liu ................................... 362/80.1 |
| 5,524,368 | 6/1996 | Struck . |
| 5,711,590 | * 1/1998 | Gotoh et al. ......................... 362/43 |
| 5,841,203 | * 11/1998 | Chambers et al. .............. 307/10.8 |
| 5,847,513 | * 12/1998 | Host ................................... 315/82 |
| 6,005,300 | * 12/1999 | Kelly ................................... 315/83 |
| 6,015,219 | * 1/2000 | Kelly ................................. 362/267 |

OTHER PUBLICATIONS meyer Snow Plow Lights, Form No. 1–696, Jul. 1996.
Meyer Snow Ploy Lights, Form No. 1–696R. Mar. 1997.
Meyer Snow Plow Lights, Form No. 1–705, Apr. 1998.

* cited by examiner

Primary Examiner—Don Wong
Assistant Examiner—Thuy Vinh Tran
(74) Attorney, Agent, or Firm—Vickers, Daniels & Young

(57) ABSTRACT

An auxiliary multiplex vehicle light harness which includes a headlight connector to connect to a headlight, a power connector to connect to a headlight plug, an auxiliary light connector to connect to an auxiliary light, and a microprocessor to control the auxiliary lights. The auxiliary lights may also include a microprocessor to control one or more operations within the auxiliary lights.

55 Claims, 7 Drawing Sheets

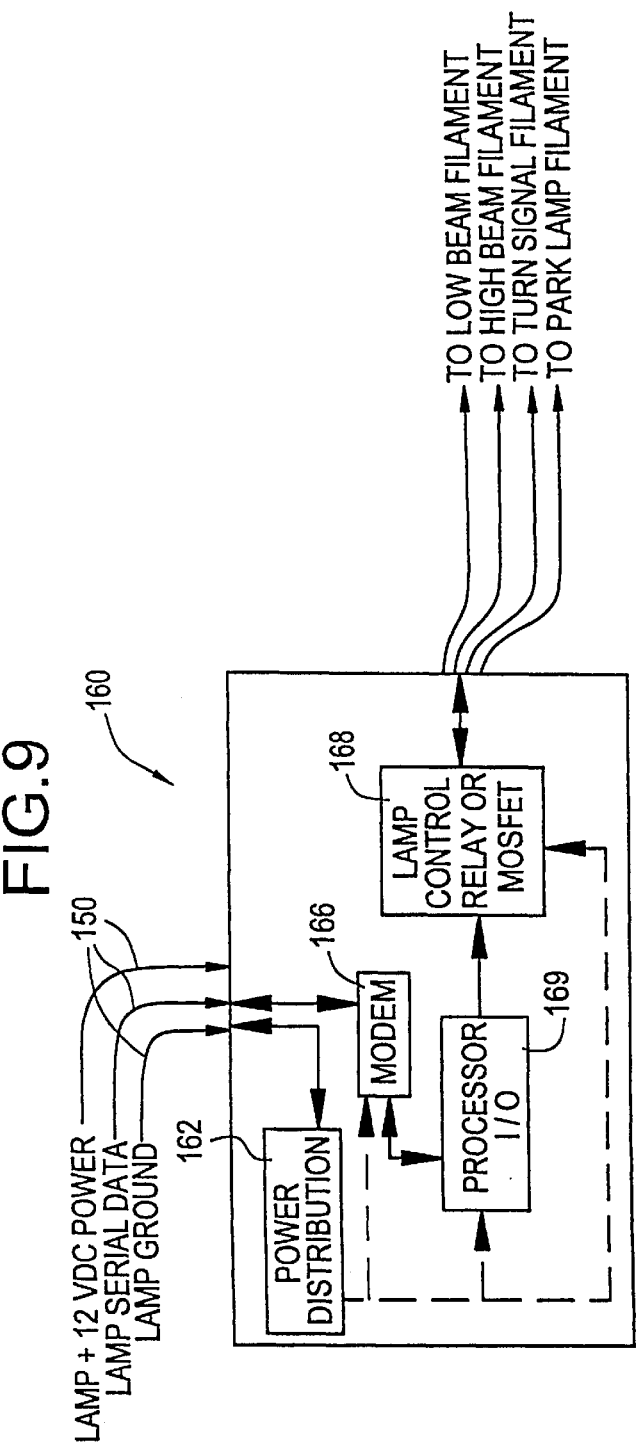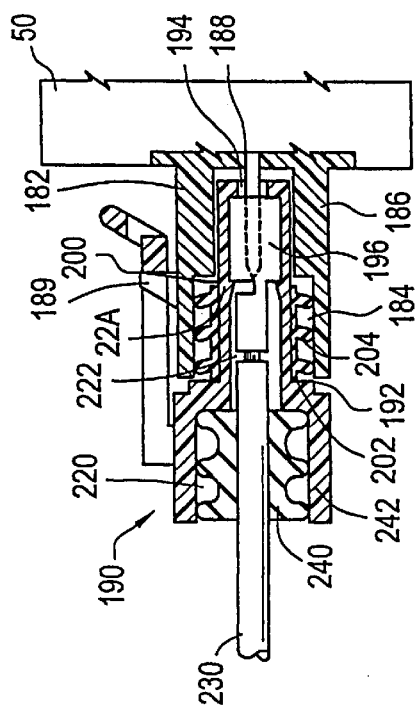

MULTIPLEX LIGHT HARNESS

This application is a continuation of Ser. No. 09/294,905 filed Apr. 21, 1999, which is a continuation-in-part of my U.S. patent application Ser. No. 09/232,238 filed Jan. 19, 1999 titled "Day Light Harness Adaptor", now U.S. Pat. No. 6,153,975.

The invention relates to the art of exterior lighting for vehicles and, more particularly, to an auxiliary light and wiring arrangement for connecting an auxiliary light to a vehicle.

The present invention finds particular utility in connection with vehicles such as snow plows having an attached plow blade and, accordingly, is disclosed and described in detail hereinafter in connection with such use. However, it will be appreciated that the invention is applicable to other lighting and electrical connection uses.

INCORPORATION BY REFERENCE

U.S. patent application Ser. Nos. 09/018,930 filed Feb. 5, 1998 titled "Auxiliary Lamp Unit"; 09/159,035 filed Sep. 23,1998 titled "Light Harness"; 09/232,398 filed Jan. 19, 1999 titled "Day Light Harness Adaptor"; and U.S. Letters Patent Nos. Des. 243,274; Des. 255,167; Des. 260,937; Des. 399,326; and 4,280,062 are incorporated herein as background information on prior art auxiliary light harnesses and auxiliary light designs.

BACKGROUND OF THE INVENTION

Auxiliary lights are light sources utilized to supplement a vehicle's standard lighting. These lights are often used, for example, on snowplow vehicles and on off-road vehicles. The lights for these uses are designed to either mount on the frame of a snow plow or some other external component of the vehicle capable of supporting the light. Although the use of auxiliary lights is becoming popular for various types of vehicles and vehicle applications, the type of available lights and the wiring harness used to connect these auxiliary lights to the vehicle's existing electrical system have many inherent problems.

Existing auxiliary light designs commonly utilize a conventional sealed beam headlight within the auxiliary light housing assembly. Due to the size and weight of the conventional sealed beam auxiliary lights, such auxiliary lights are undesirably heavy, thereby requiring stronger and costlier housing materials and/or reinforcement of the components in the auxiliary light housing. These heavy auxiliary lights also limit the mounting locations on the vehicle and can result in increased incidents of damage to the light and/or vehicle when the vehicle is operated in harsh and/or in off-road environments. Another problem with existing auxiliary lights is the design of such lights and the difficultly in replacing parts. Replacement of a sealed beam headlight varies in difficulty based on the structure, age and condition of the auxiliary lighting assembly. The removal of the cover plates and support thereof is difficult and time consuming. Dismounting of the auxiliary light can also be difficult since such lights do not include integral mounting components, thereby requiring an additional support member, a bezel, and/or other components to secure the light to the housing. The auxiliary lights typically include pads which provide cushioning and reduce vibration of the light components. The location and number of components of the auxiliary light make it difficult to access, remove, replace and reseal the auxiliary light components. Many of the problems associated with auxiliary lights are addressed and overcome by the improved auxiliary light disclosed in U.S. Pat. DES. 399,326 and U.S. patent application Ser. No. 09/018,930, filed Feb. 5, 1998, both of which are incorporated herein by reference.

The wiring arrangements or harnesses for auxiliary light systems also have many problems. Traditionally, the auxiliary lights were spliced into the existing wiring for the headlights of the vehicle. The splicing of the existing wiring caused many problems. Wires which were not properly spliced together become loose resulting in the auxiliary lights and/or headlights to malfunction. Improperly spliced wires also resulted in electrical shorts which could damaged the electrical system of the vehicle and/or cause a malfunction with one or more electrical systems of the vehicle, including the headlights and/or auxiliary lights. The splicing of OEM wiring of the headlights further resulted in the voiding of many of the warranties for the OEM wiring of the headlights of the vehicle. The splicing of the auxiliary light system into the existing electrical system of the vehicle further made it difficult to connect and disconnect the auxiliary lights when the auxiliary lights needed to be repaired or were not needed. Such connecting and disconnecting also resulted in increased wear and damage to the spliced region of the vehicle electrical system thereby resulting in increased incidents of failure or malfunction of the vehicle electrical system.

In view of the problems associated with splicing auxiliary lights to the existing electrical system of a vehicle, auxiliary light harnesses were developed to eliminate the need to splice the OEM wiring to the headlights of a vehicle. One such electrical harness is disclosed in U.S. Letters Patent No. 4,280,062 issued to Richard R. Miller. The Miller harness connects the headlights of a vehicle and two auxiliary lights to a single existing vehicle plug that is connected to a vehicle headlight power source. The Miller harness requires the existing headlight wiring harness to be disconnected prior to using the harness. Therefore, when using the Miller harness, a portion of the OEM wiring of the vehicle is not used and can be discarded. Although the Miller harness overcomes some of the problems associated with splicing OEM wiring for the headlights of the vehicle, several problems exist when using the Miller harness.

The Miller harness is designed to connect two basic auxiliary lights to a vehicle's headlight power source. The Miller harness cannot be used with auxiliary lights that house emergency and/or turning signal lights along with the beam light. Consequently, the Miller harness is limited for use with only certain types of auxiliary lights. The Miller harness is designed to provide power to the vehicle headlights and/or the auxiliary lights from a single vehicle headlight power source. The current drawn on the single vehicle headlight power source during the operation of both headlights and/or auxiliary lights can result in an overload and/or damage to the wiring of the single vehicle headlight source by too much current being drawn through the wiring. The Miller harness, during installation, requires a cable containing at least six wires to be inserted through the fire wall of the vehicle so that a six pole switch can be mounted on or near the dashboard of the vehicle. Due to the large number of wires, a large hole must be drilled through the fire wall of the vehicle. Such size a hole can be difficult to form in the fire wall and can result in damage to the vehicle. The switch used in the Miller harness required six or more wires to be connected in a certain arrangement for the switch to operate properly. Improper connection of the wires to the switch results in a short in the harness which can cause damage and/or malfunction to the electrical system of the vehicle and/or damage to the headlights and/or auxiliary lights. In addition, due to the multiple wires connected to the switch of the Miller harness, it is difficult to locate a damaged or faulty wire to the switch and/or replace a wire to the switch. Shorting of the electrical system of the Miller harness and/or vehicle electrical system can occur during the use of the Miller harness. When using the Miller harness, only one of the vehicle headlight power sources is connected to the harness. The other vehicle headlight power source remains disconnected. During the operation of the vehicle, moisture, dirt, etc. can collect in the unused headlight power source and can cause a short during the operation of the vehicle. Furthermore, when the auxiliary headlights are disconnect from the Miller harness and the harness is not removed from the vehicle, the connectors for the auxiliary lights can collect moisture, dirt, etc. which can cause a short during the operation of the vehicle. The Miller harness also cannot be partially or totally detached and reattached in the vehicle without significant difficulty. When the Miller harness requires a portion to be removed from the vehicle for repair, the complete harness must be removed from the vehicle. This requires the multiple wires to the switch to be pulled through the vehicle fire wall and out of the engine compartment without damaging the wires. When the Miller harness is to be reattached to the vehicle, the multiple wires must be inserted through the fire wall without damaging the wires and properly reattached to the switch.

Many of the problems associated with prior auxiliary light harnesses are addressed and overcome by the auxiliary light harness disclosed in U.S. patent application Ser. No. 09/159,035 filed Sep. 23, 1998, which is incorporated herein by reference. The auxiliary light harness has electrical connectors which connect to the OEM wiring of a vehicle headlight and to the OEM wiring for the power source of the vehicle headlight. The auxiliary light harness has two connectors whereby one of the connector connects to the vehicle headlight and the other connector connects to the power source of the vehicle headlight. The auxiliary harness design utilizes all of the OEM wiring of a vehicle and none of the OEM wiring of the vehicle is discarded or only partially utilized when the auxiliary light harness is attached to the vehicle. The auxiliary light harness also can be integrated with the turning signals and/or emergency lighting of the vehicle. The auxiliary light harness includes solid state circuitry to reduce the complexity of installation, operation, maintenance and repair of the auxiliary multiplex light harness. The auxiliary light harness has a modular unit which allows the auxiliary lights to be easily detached and removed from the vehicle without having to dismantle and remove the complete auxiliary light harness from the vehicle. The auxiliary light system is connected to the vehicle power source to reduce the occurrences of the auxiliary lights inadvertently draining the power of the vehicle's battery. The auxiliary light harness also incorporates special connectors to ensure that the connectors will not inadvertently become disconnected during operation, or the circuitry becoming damaged and/or creating a short in the auxiliary light harness.

Although the light harness disclosed in U.S. patent application Ser. No. 09/159,035 overcomes many of the problems of prior light harnesses, the improved light harness could not be used with daytime running lights. In certain countries and states, vehicles that are operated during the daytime must have daytime running lights. When a snow plow blade is attached to a vehicle, the snow plow blade covers or obstructs the daytime running lights. Several countries and states require that the auxiliary lights be activated during the daytime to replace the daytime running lights. In some states, the activation of the auxiliary lights satisfies the daytime running light requirements. However, in several states, the low beam auxiliary lights are too bright. As a result, the use of low beam auxiliary lights during the day violates certain country and states laws. In addition, the use of low beam auxiliary lights during the day time reduces the life of the auxiliary lights thereby causing more frequent bulb replacement.

The problems associated with daytime running lights are addressed and overcome by the daylight harness adaptor disclosed in U.S. patent application Ser. No. 09/232,398 filed Jan. 19, 1999, which is incorporated herein by reference. The harness adaptor can be integrated with an auxiliary light harness to reduce the lumen output of the auxiliary lights during daytime running. The auxiliary harness includes a light sensor and/or is connected to an existing light sensor on the vehicle and is used to set the beam mode of the auxiliary lights.

Although the light harnesses disclosed in U.S. patent application Ser. Nos. 09/159,035 and 09/232,398 overcome many of the problems of prior auxiliary light harnesses, the wiring of the auxiliary light harness is relatively complex and typically requires professional installation. The daylight adaptor must be properly connected to the auxiliary light harness for proper operation. The installation of the auxiliary harness still requires the mounting and connecting of several components. In addition, the auxiliary light harness requires the fire wall of the vehicle to be penetrated, which can be both difficult and time consuming. Due to the complexity of installing the auxiliary harness, problems periodically occur in the auxiliary light system due to improper installation. As a result, time consuming system checks must be methodically made to ensure that the auxiliary harness is properly installed. In addition, when the headlights and/or auxiliary lights malfunction, it is difficult and time consuming to identify and isolate the source of the problem.

In view of the existing deficiencies of auxiliary light harnesses, there is a need for an auxiliary light harness that can be used with a wide variety of auxiliary lights, which eliminates the need to splice the wiring to the headlights of a vehicle, which is easy to install in a vehicle, which reduces the occurrences of overloading the OEM wiring of the vehicle, which protects against shorting of an electrical circuit, which one or more components of the harness can be easily detached and reattached to the vehicle, which components of the harness can be easily accessed for easy repair and/or replacement, which includes integrated daytime running light circuitry, to reduce the lumen output of the auxiliary lights during daytime running, which increases the bulb life of daytime running auxiliary lights, which can be tested for proper operation of the harness components and/or vehicle lighting components, and which problems can be quickly identified and corrected.

SUMMARY OF THE INVENTION

An auxiliary multiplex light harness in accordance with the present invention overcomes the foregoing and other problems heretofore encountered in connection with the use of prior auxiliary light harnesses. The auxiliary light harness incorporates a simple modular design that simplifies the installation of the auxiliary multiplex light harness which reduces installation errors, and improves the safety and reliability of the auxiliary multiplex light harness.

In accordance with the present invention, there is provided an auxiliary multiplex light harness for connecting auxiliary headlights, such as snow plow lights, to the OEM wiring of a vehicle and will be describe with particular reference thereto; however, the invention has broader applications and can be use to connect many types of auxiliary electrical systems and lights to the OEM wiring of a vehicle.

In accordance with the principle feature of the present invention, the auxiliary multiplex light harness includes electrical connectors designed to connect to the OEM wiring of the vehicle headlights and to the OEM wiring for the power source of the vehicle headlights. The vehicle headlights include a connector which connects to the power source of a vehicle. The auxiliary multiplex light harness includes connectors whereby one of the connectors is connected to the vehicle headlight or headlight wiring and anther connector is connected to the power source to which the vehicle headlight was originally attached. Consequently, the auxiliary multiplex light harness design preferably utilizes all of the OEM wiring of a vehicle, thus none of the OEM wiring of the vehicle is discarded or only partially utilized when the auxiliary multiplex light harness is attached to the vehicle.

In accordance with still another feature of the present invention, the auxiliary multiplex light harness is designed to be integrated with the turning signals and/or emergency lighting of the vehicle. In this regard, the auxiliary headlights include turn signals and/or emergency lighting so that such turning signals and/or emergency lights are activated when the operator of the vehicle activates the turning signals and/or emergency lights. As can be appreciated, the auxiliary multiplex light harness can be connected and/or integrated in a variety of electrical systems of the vehicle, and can be used to connect a variety of auxiliary lights to the vehicle.

In accordance with still another feature of the present invention, the auxiliary multiplex light harness includes circuitry which reduces the complexity of installation, operation, maintenance and repair of the auxiliary multiplex light harness. In one preferred design, the auxiliary multiplex light harness includes solid state circuitry which controls the activation and deactivation of the auxiliary lights, and/or the intensity of the light from the auxiliary lights. The solid state circuitry increases the reliability of the auxiliary multiplex light harness circuitry and reduces the number of wires needed to connect the auxiliary multiplex light harness to the OEM wiring of the vehicle. The reduced number of wires needed for the overall circuitry of the auxiliary multiplex light harness greatly simplifies the installation, maintenance, repair, and operation of the auxiliary multiplex light harness, and enhances the reliability of the auxiliary multiplex light harness.

In accordance with still yet another feature of the present invention, the auxiliary multiplex light harness is designed to be a modular unit which allows the auxiliary lights to be easily detached and removed from the vehicle without having to dismantle and remove the complete auxiliary multiplex light harness from the vehicle. This modular design of the auxiliary multiplex light harness also allows for components of the auxiliary multiplex light harness to be easily removed and replaced when in need of repair or replacement without having to completely remove or dissemble the auxiliary multiplex light harness from the vehicle.

In accordance with another feature of the present invention, the auxiliary multiplex light harness is connected to the vehicle power source in a manner as to reduce the occurrences of the auxiliary lights inadvertently draining the power of the vehicle's battery. Preferably, the auxiliary multiplex light harness is connected to the ignition mechanism of the vehicle such that the ignition switch must be activated prior to the auxiliary lights being activated. When the ignition switch of the vehicle is activated, the vehicle's engine is typically running, thereby supplying sufficient power to the vehicle. During the operation of the engine, the activation of the auxiliary lights can be activated without draining the battery power of the vehicle.

In accordance with still yet another feature of the present invention, the auxiliary multiplex light harness can be designed to allow the vehicle's headlights or the auxiliary lights of the vehicle to be activated; or allow both the auxiliary lights and the headlights of the vehicle to be activated. When the auxiliary multiplex light harness is used to attach snowplow lights to a vehicle, the headlights of the vehicle are typically deactivated when the snowplow lights are activated since the snowplow blade typically obstructs the light from the headlights. Therefore, it is sometimes desirable to deactivate the headlights of the vehicle upon activation of the plow lights so as to preserve the life of the vehicle headlights. In other applications wherein the auxiliary lights are fog lights, it is desirable to have both the fog lights and the headlights simultaneously activated to increase the number of lumens generated by the vehicle.

In accordance with another feature of the present invention, the auxiliary multiplex light harness incorporates circuitry to operate the auxiliary lights for daytime running. The auxiliary multiplex light harness is integrated with the high and low beam switch for the vehicle headlights so that the same switch can be used to control the beam mode of the auxiliary lights when the auxiliary lights are activated. In one preferred embodiment, the beam mode of the auxiliary lights is automatically controlled. In this arrangement, the auxiliary harness includes a light sensor and/or is connected to an existing light sensor on the vehicle. The light sensor is used to set the beam mode of the auxiliary lights. When the light sensor detects light during day light hours, the light sensor sends a signal to the auxiliary multiplex light harness circuitry to set the auxiliary lights to the desired beam mode such as low beam mode. The signal from the light sensor can also be used to enable the use of the auxiliary multiplex light harness during day light hours, automatically activate the auxiliary lights during day light hours and/or automatically activate the auxiliary lights during night time hours.

The auxiliary multiplex light harness circuitry also preferably alters the intensity of light produces by the auxiliary lights. The operation of auxiliary lights during the day light hours can produce unnecessarily bright light during operation. The daytime running lights are intended to draw attention to a vehicle during the day. The operation of high intensity lights is unnecessary to draw attention to a vehicle. In some instances, the operation of bright lights during the day can cause unwanted glare for the operator and/or for other vehicle operators. In addition, most auxiliary lights burn out at a faster rate when operated in high beam mode. The reduction of power to the auxiliary light can increase the life of the bulb. The auxiliary light harness includes circuitry to enable the auxiliary light to be operated at low beam mode. The low beam mode setting can be manually and/or automatically controlled.

In accordance with still yet another feature of the present invention, the auxiliary multiplex light harness incorporates circuitry to reduce the intensity of light produces by the auxiliary lights in low beam mode. In several states, regulations exist concerning the brightness of daytime running lights. Typically, these regulations require that the daytime running lights be 10–50% less bright than headlights operated in the low beam mode. The auxiliary multiplex light harness includes circuitry to reduce the intensity of the auxiliary lights to produces a light intensity that is less than the light intensity at low beam mode. In one preferred embodiment, the intensity of the auxiliary lights is reduces by altering the modulation of current and/or voltage to the auxiliary lights. The altered modulation or current and/or voltage to the auxiliary lights reduces the power to the auxiliary lights over time thereby resulting in a reduction of lumens produced by the auxiliary lights. In another embodiment, the current and/or voltage to the auxiliary lights is reduced thereby reducing the power to the auxiliary lights and causing a reduction of lumens produced by the auxiliary lights. In yet another preferred embodiment, the auxiliary light harness can be manually adjusted to control the amount of reduction in lumens produced by the auxiliary lights. In one arrangement, the auxiliary light harness includes a variable resistor that can be manually adjusted to regulate the lumens produced by the auxiliary lights.

In accordance with a further feature of the present invention, the auxiliary multiplex light harness includes circuitry to draw or divert power from the auxiliary lights to result in a reduction of power to the auxiliary lights. In one preferred embodiment, a switch mechanism is used to periodically ground the power to the auxiliary lights thereby reducing the power to the lights.

In accordance with still a further feature of the present invention, the auxiliary multiplex light harness operates the auxiliary lights in daytime running mode during daylight hours and when the headlights and/or auxiliary lights are turned off. The operation of the daytime running mode for the auxiliary lights is only necessary during daytime hours. The auxiliary multiplex light harness circuitry is designed to deactivate the daytime running circuitry when the light sensor does not detect daylight. The auxiliary multiplex light harness circuitry preferably includes a device to deactivate the daytime running mode circuitry upon detection of the activation of the headlights and/or auxiliary lights by an operator. This circuitry design prevents the primary circuitry for the headlights/auxiliary lights to simultaneously operate with the daytime running mode circuitry. In one preferred embodiment, the light detector only activates the daylight running circuitry upon detection of actual light, not artificial light. In another preferred embodiment, the daytime running mode circuitry includes a switch to deactivate, isolate or otherwise disable the daytime running mode circuitry upon detection of the activation of the headlights or auxiliary lights of a vehicle.

In accordance with still yet a further feature of the present invention, the auxiliary multiplex light harness is integrated with the circuitry of the daytime running lights of a vehicle. The auxiliary light harness can be designed to deactivate the daytime running lights when the auxiliary lights are connected to the vehicle. Alternatively, the auxiliary light harness can be designed to enable the use of both the daytime running lights and the auxiliary lights during day light hours. The activation and/or deactivation of the daytime running lights can be manual or automatic.

In accordance with another feature of the present invention, the auxiliary multiplex light harness includes a processing module to control the operation of the auxiliary lights. The processing module is designed to receive signals from various components on and/or in the vehicle and control the operation of the auxiliary lights based upon such received information. Preferably, the processing module receives and sends electronic signals. The processing module is preferably powered by one or more power sources in the vehicle (i.e. battery, photoelectric cell); however, the processing module can include its own power source to be used alone or in combination with the vehicle power source. In one preferred embodiment, the processing module controls the operation of one or more auxiliary lights. In another preferred embodiment, the processing module controls the operation of one or more auxiliary lights and one or more vehicle lights. In still another preferred embodiment, the processing module controls the operation of one or more auxiliary lights, one or more vehicle headlights, one or more vehicle turn signals, one or more vehicle parking lamps, one or more vehicle daylight running lamps, and/or vehicle emergency lights. In still yet another preferred embodiment, the processing module receives one or more signals from the vehicle headlight(s) and/or related circuitry, the vehicle tail light(s) and/or related circuitry, the vehicle parking lamp(s) and/or related circuitry, the vehicle turn signal(s) and/or related circuitry, the vehicle day light running lamp(s) and/or related circuitry, the vehicle high/low beam switch, the vehicle ignition switch, the auxiliary light(s) and/or related circuitry, the vehicle alternator circuitry, other auxiliary light circuitry, and/or a processor activator switch.

In accordance with still another feature of the present invention, the auxiliary multiplex light harness uses and/or generates analog and/or digital signals to control one or more components on the vehicle. The analog/digital signals enhance the ability of the processing module to properly control the operation of the auxiliary lights, the vehicle lights, the daylight running lights, the emergency lights, and/or the turning signal lights. The analog/digital signals enable the processing module to receive and/or send distinct signals that can be easily verified and/or interpreted so as to minimize errors during operation. The use of a distinct analog/digital signal enables the processing module to screen out or filter undesired signal noise thereby provide increase operational accuracies and efficiencies. The use of a distinct signal enables easy verification of the signal. The processing module can be designed to send and/or receive verification signals and/or have some other protocol to verify the signals received and/or sent, and/or to verify whether the instructions were properly receive and/or sent. The use of an analog/digital signal can result in the auxiliary multiplex light harness incorporating less wires. The reduction of wires results in the simplification of installation and maintenance. In one preferred embodiment, the processing module receives and processes parallel communication information. In one specific embodiment, the parallel communication data is digital data. In another preferred embodiment, the processing module generates parallel communication data to control one or more components on a vehicle.

In accordance with still yet another feature of the present invention, the auxiliary multiplex light harness incorporates a device to convert signals into a different form for transmission through the circuitry of the auxiliary multiplex light harness. In one preferred embodiment, the signal conversion device converts parallel communication information to serial information. In another preferred embodiment, a signal conversion device converts serial information to parallel communication information. In still another preferred embodiment, the signal conversion device converts digital parallel communication information to digital serial information and digital serial information to digital parallel communication information. In still yet another preferred embodiment, the processing module includes circuitry to convert the signals. In one specific embodiment, the processing module includes circuitry in the processing module similar to a modem to convert signals to and/or from other components.

In accordance with yet another embodiment of the present invention, the auxiliary multiplex light harness includes a remote switch to active and/or deactivate one or more components of the auxiliary multiplex light harness. The switch preferably generates a radio frequency to activate the one or more components of the auxiliary multiplex light harness. As can be appreciated, the switch can generate another type of signal or a combination of signals to one or more components of the auxiliary multiplex light harness, such as, but not limited to infrared signals, audio signals, ultraviolet signals, microwaves, and the like. The remote switch preferably generates a coded signal that is recognized and/or verifiable by one or more components of the auxiliary multiplex light harness. The remote switch may be mounted in the cabin of the vehicle or be mounted on a key ring or the like. The remote switch allows the auxiliary multiplex light harness to be installed in a vehicle without having to drill through the firewall of the vehicle, thus significantly simplifying the installation of the auxiliary multiplex light harness. In one preferred embodiment, the remote switch activates and deactivates the auxiliary lights. In another preferred embodiment, the remote switch activates and/or deactivates components other than the auxiliary lights. In one specific embodiment, the remote switch generates a coded radio frequency, when activated by an operator, which coded frequency is received by the processing module that in turn causes the processing module to activate and/or deactivate one or more components of the auxiliary multiplex light harness and/or to cause the processing module to generate and/or terminate the generation of signals. In still another preferred embodiment, the remote switch activates one or more functions of the auxiliary multiplex light harness.

In accordance with a further feature of the present invention, the auxiliary multiplex light harness incorporates a test sequence to test the function of one or more components of the auxiliary multiplex light harness. The test sequence can be used to determine if the auxiliary multiplex light harness has been properly installed and/or if one or more components are operating properly. Preferably the test sequence is an electronic sequence that activates and/or tests one or more components in a predetermined sequence. The test sequence can be manually and/or automatically activated. In one preferred embodiment, the processing module includes a preprogrammed test sequence. In one specific embodiment, the test sequence is activated manually by a remote switch.

In accordance with another feature of the present invention, the auxiliary multiplex light harness incorporates the use of shielded cable to reduce the transmission and/or incorporation of noise. The shielding can be any type of shielding that inhibits unwanted signals, such as magnetic or electrical signals, from being transmitted and/or received by the cables inside the shielding. Preferably the shielded cable includes two electrical wires for transmission of current and one wire that transmits an analog/digital signal.

In accordance with yet another feature of the present invention, the auxiliary lights include a light controller that controls the operation of the auxiliary light components. The light controller is designed to control one or more modes of the auxiliary light such as, but not limited to, the low beam mode, the high beam mode, the daylight running mode, the on mode, the off mode, the turning light mode, the emergency light mode, and/or the test sequence mode. The light controller is designed to receive and/or transmit analog/digital signals from and/or to the processing module. The light controller incorporates a device to convert signals into a different form. In one preferred embodiment, the signal conversion device converts parallel communication information to serial information. In another preferred embodiment, signal conversion device converts serial information to parallel communication information. In still another preferred embodiment, the signal conversion device converts digital parallel communication information to digital serial information and digital serial information to digital parallel communication information. In one specific embodiment, the light controller includes circuitry in the processing module similar to a modem to convert signals to and/or from other components.

In accordance with another feature of the present invention, the auxiliary multiplex light harness incorporates special connectors to ensure that the connectors will not inadvertently become disconnected during operation. Preferably, the connectors include a lock system such as a snap lock, which ensures that the connectors are properly secured together and to further prevent the connections from loosening or becoming disconnected during the operation of the vehicle. The connectors are also preferably designed to allow the connectors to be connected in only one manner, so as to prevent an improper connection. In this manner, the connectors are specially shaped so that the connectors can only be attached together in one manner.

In accordance with yet another feature of the present invention, the auxiliary multiplex light harness includes a seal arrangement to prevent foreign materials from damaging and/or causing a short in the circuitry of the auxiliary multiplex light harness. Preferably, the connectors utilized in the auxiliary light harness include seals that inhibit and/or prevent liquid, dust, dirt and/or other debris from contacting the electrical connections of the auxiliary multiplex light harness. In one preferred design, the connectors include rubber, plastic, and/or Teflon seals to prevent foreign materials from interacting with the electrical connections of the vehicle light harness. The seals help prevent corrosion of the electrical connections, bad connections between the electrical connections, shorting of the electrical connections and the like.

In accordance with another feature of the present invention, the connectors include plugs which are utilized when the auxiliary lights are disconnected and removed from the vehicle. After the auxiliary lights are disconnected from the auxiliary multiplex light harness, the electrical connectors of the auxiliary multiplex light harness are exposed to the environment. The connector plugs are designed to connect to the ends of these electrical connections to seal the electrical connections from the environment, thereby inhibiting and/or preventing corrosion of the electrical connections, and/or other debris from depositing on the electrical connections which may impair the operation of the auxiliary multiplex light harness when the auxiliary lights are once again attached to the harness. Preferably, these plugs are also used for the ends of the connectors on the auxiliary multiplex light harness that connect to the auxiliary light connectors so as to also prevent corrosion and/or debris depositing on and/or in the electrical connections while the auxiliary lights are being stored.

It is accordingly a principal object of the present invention to provide an improved auxiliary multiplex light harness to be used in conjunction with a vehicle which is simple to install and operate.

Another object of the present invention is the provision of an auxiliary multiplex light harness which can be used with a wide variety and style of auxiliary lights.

Still another object of the present invention is the provision of an auxiliary multiplex light harness which utilizes the OEM wiring of a vehicle headlight system without the need to splice the OEM wiring to the vehicle headlights.

Yet another object of the present invention is the provision of an auxiliary multiplex light harness which utilizes all of the OEM wiring for the headlight system of a vehicle.

Still yet another object of the present invention is the provision of an auxiliary multiplex light harness which reduces the occurrence of overloading the OEM wiring of the vehicle during the operation of the auxiliary lights.

Another object of the present invention is the provision of an auxiliary multiplex light harness which operates the auxiliary lights for daytime lighting.

Still another object of the present invention is the provision of an auxiliary multiplex light harness which reduces the intensity of the light from the auxiliary lights during daytime running.

Still yet another object of the present invention is the provision of an auxiliary multiplex light harness which increases the life of the auxiliary lights during daytime running.

Yet a further object of the present invention is the provision of an auxiliary multiplex light harness which can be manually adjusted to regulate the intensity of the auxiliary lights.

Another object of the present invention is the provision of an auxiliary multiplex light harness that incorporates the use of a remote switch to activate and/or deactivate one or more components connected to the auxiliary harness.

Yet another object of the present invention is the provision of an auxiliary multiplex light harness that incorporates the use of a test sequence.

Still another object of the present invention is the provision of an auxiliary multiplex light harness that includes a processing module to control the operation of the components of the light harness.

Still yet another object of the present invention is the provision of an auxiliary multiplex light harness that incorporates a light controller in the auxiliary lights.

A further object of the present invention is the provision of an auxiliary multiplex light harness that screens out noise in the circuit.

Still yet a further object of the present invention is the provision of an auxiliary multiplex light harness that convents the form of the signals in the light harness.

Another object of the present invention is the provision of an auxiliary multiplex light harness which protects against the shorting and/or the damage of the electrical system of the auxiliary multiplex light harness.

Still another object of the present invention is the provision of an auxiliary multiplex light harness which allows for one or more of the components of the harness to be easily attached and reattached to the vehicle without having to substantially remove the harness from the vehicle.

Yet another object of the present invention is the provision of an auxiliary multiplex light harness which can be easily maintained and repaired.

Still yet another object of the present invention is the provision of an auxiliary multiplex light harness which reduces the occurrences of the components of the harness being incorrectly connected together.

Still a further object of the present invention is the provision of an auxiliary multiplex light harness which reduces the occurrence of components becoming inadvertently disconnected during the operation of the vehicle.

Another object of the present invention is the provision of an auxiliary multiplex light harness which includes a modular design that simplifies the installation, repair, maintenance and operation of the auxiliary lights on a vehicle.

Yet another object of the present invention is the provision of an auxiliary multiplex light harness which reduces the occurrence of inadvertent power drain of a vehicle's battery during the operation of the auxiliary lights.

Yet still another object of the present invention is the provision of an auxiliary multiplex light harness which includes solid state circuitry to improve the reliability and simplicity of operation, maintenance, installation, and repair or the auxiliary vehicle light harness.

Another object of the present invention is the provision of an auxiliary multiplex light harness that includes a sealing arrangement to reduce degradation of the electrical circuitry and/or interface with electrical connections.

These and other objects and advantages will become apparent from the following description used to illustrate the preferred embodiment of the invention when read in conjunction with the accompanying drawings.

BRIEF DESCRIPTION OF THE DRAWINGS

FIG. 9 is schematic view of the light controller of the present invention;

FIG. 11 is a cross sectional view along line 11—11 of FIG. 10.

DESCRIPTION OF THE PREFERRED EMBODIMENTS

Figure 1:
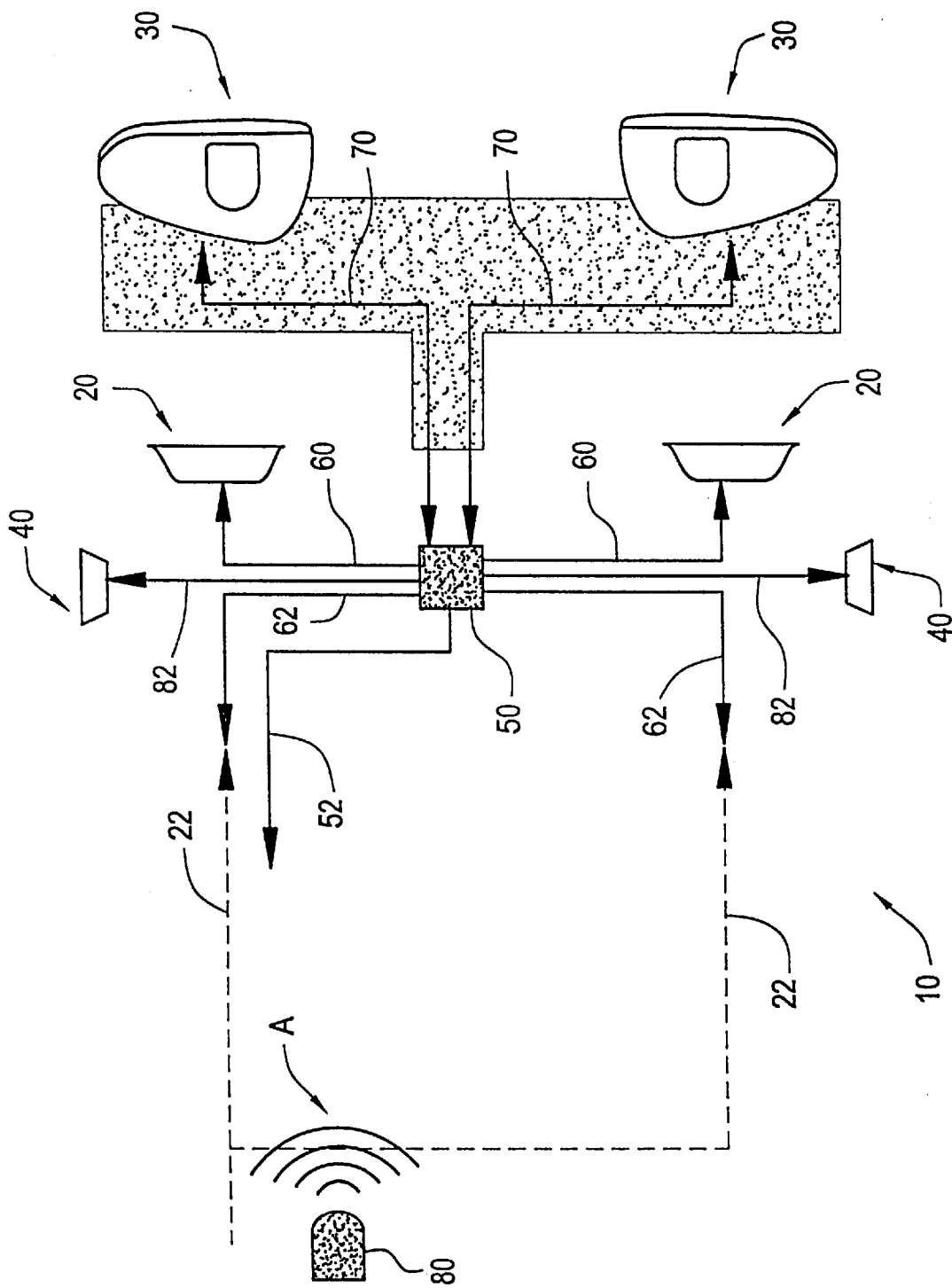
FIG. 1 is a schematic view of the auxiliary multiplex light harness in accordance with the present invention.

Referring now to the preferred embodiment of the drawings, wherein the showings are for the purpose of illustrating a preferred embodiment of the invention only and not for the purpose of limiting the invention, FIG. 1 is schematic drawing of the auxiliary light harness 10 in accordance with the present invention. Auxiliary multiplex light harness 10 is designed to electrically connect auxiliary lights 30 to the electrical system of a vehicle. As specifically illustrated in FIG. 1, auxiliary lights 30 are auxiliary headlights which are electrically connected to the headlight electrical circuitry of a vehicle. The auxiliary headlights are preferably the auxiliary lights disclosed in U.S. Letters Patent No. Des. 399,326, and in U.S. patent application Ser. No. 09/018,930, subject to a few internal modifications as will be discussed below.

In a typical vehicle, the vehicle includes two headlights 20 wherein each of the headlights includes wiring which is electrically connected to the light in the headlight at one end and includes a connector at the other end. The headlight wire connector is electrically connected to the OEM headlight wiring 22 of the vehicle. The vehicle also typically includes a turn/emergency light 40 which has a turn light and an emergency light. The turn light and emergency lights are also connected to the OEM light wiring of the vehicle.

Auxiliary multiplex light harness 10 is designed to connect to the headlight wiring connectors, turn and emergency light wiring and to the OEM headlight wiring connectors. The auxiliary multiplex light harness is also designed to be connected to the OEM daytime running light circuitry of the vehicle, it such vehicle is so equipped. Once the auxiliary multiplex light harness 10 is properly connected to the electrical system of a vehicle, all the OEM wiring to the headlights of the vehicle is operational and used by the auxiliary multiplex light harness.

FIG. 1 illustrates auxiliary multiplex light harness 10 integrated into the electrical system of the vehicle. The headlight OEM wiring 22 is connected to the harness power wiring 62. The headlights 20 are connected to the harness headlight wiring 60. Harness headlight wiring 60 and harness power wiring 62 are both connected to the processing module 50. Auxiliary lights 30 are connected to harness auxiliary light wiring, which is connected to processing module 50. The turn/emergency lights 40 are connected to their respective OEM wiring. The harness turn/emergency wiring 82 is connected to the OEM wiring of the turn/emergency lights 40, which is connected to processing module 50. Processing module 50 is energized by power provided by the module power wiring 52. A remote switch 80 is designed to generate a signal A to be received by processing module 50. The processing module is designed to control the operation of the headlights and auxiliary lights, and will be described in detail below.

Figure 2:
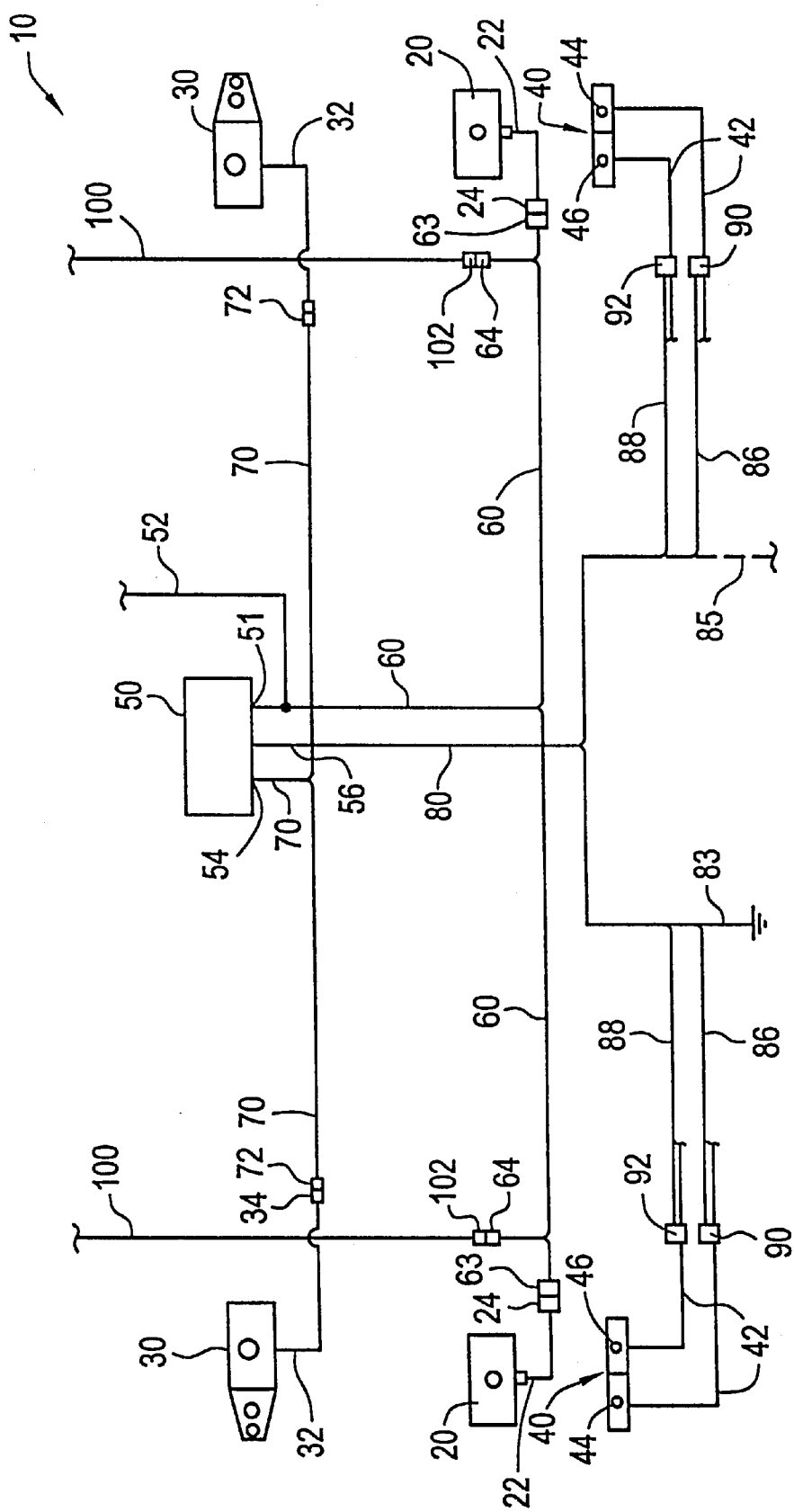
FIG. 2 is a simplified electrical schematic drawing of the auxiliary multiplex light harness illustrated in FIG. 1.

Referring to FIG. 2, auxiliary multiplex light harness 10 is connected to the OEM headlight wiring of the vehicle and to the turn light and emergency light wiring of the vehicle. When the auxiliary multiplex light harness 10 is installed, the headlight wiring connector 24 is disconnected from the OEM headlight wiring connector 102. The harness power wiring connector 63 is then connected to the headlight wiring connector 24. Furthermore, the harness headlight power connector 64 is connected to OEM headlight wiring connector 102. Connectors 63 and 64 are part of harness headlight wiring 60 which connects to processing module 50. Harness headlight wiring 60 includes a port connector which connects to processing port 52 of processing module 50. As illustrated in FIGS. 1 and 2, auxiliary lights 30 and headlights 20 are controlled by a single processing module 50.

Auxiliary lights 30 include auxiliary light wiring 32 which includes a wiring connector 34. Wiring connector 34 is connected to harness auxiliary light connector 72, which is connected to one end of harness auxiliary light wiring 70. At the other end of auxiliary light wiring 70 is a port connector which connects to the processing port 54 of processing module 50.

Harness signal wiring 80 includes two wires 86, 88 which are connect to wiring 42 by connectors 90, 92. The electrical connectors can take any form which creates an electrical connection between turn/emergency light wiring 42 and turn light wire 86 and emergency light wire 88. Preferably, the connectors are electrical splices. Harness signal wiring 80 includes a port connector which connects to the processing port 56 of processing module 50. Harness signal wiring 80 also includes a ground connection 83 and module power wire 52. Harness signal wiring 80 may also include a daylight running wire 85.

The auxiliary headlights 30 can be a variety of different styles and types of headlights. One preferable type of auxiliary headlight is disclosed in the assignee's U.S. Pat. DES. 399,326 and U.S. patent application Ser. No. 09/018,930, filed Feb. 5, 1998. The manner in which the auxiliary headlights can be connected to the vehicle will depend on the style and type of the vehicle and the style and type of auxiliary headlight. One preferable arrangement for mounting the auxiliary headlight is disclosed in assignee's U.S. patent application Ser. No. 09/018,930.

Figure 5:
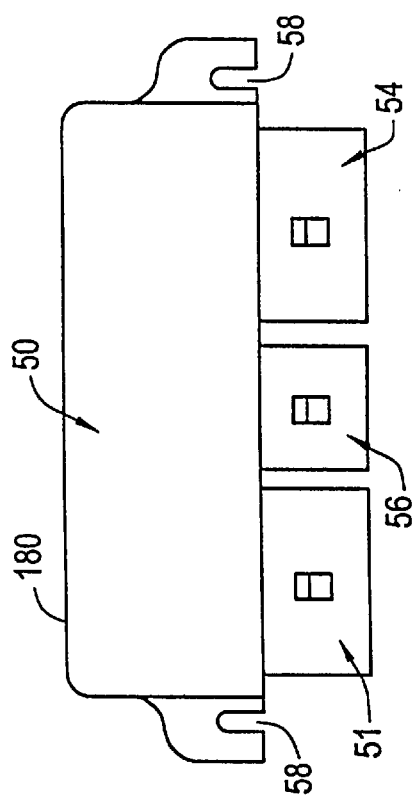
FIG. 5 is a top elevation view of the processing module.

As illustrated in FIG. 5, processing module 50 includes a module mount slot 58. Mount slot 58 is designed to allow the processing module to be secured in the interior of a vehicle by bolts, screws or the like. Preferably, the processing module 50 is mounted between the two headlights of the vehicle. As can be appreciated, the wiring for the electrical harness may be secured by ties, clamps and the like to ensure that the wiring is secured in place during the operation of the vehicle.

Referring now to FIG. 2, processing module 50 incorporates DRL (Daytime Running Light) circuitry. The DRL circuitry is designed to control auxiliary lights 30 during daytime operation of the vehicle. The DRL circuitry is connected to a light sensor, not shown, by wire 84. The light sensor can be any device that generates a signal when exposed to a light source. Preferably the light sensor produces an electrical signal when exposed to natural light. One such light sensor is a photo-electric diode. Preferably, the light sensor is the originally installed sensor in the vehicle which operates the daytime running lights of the vehicle. When the originally installed sensor is used, wire 85 is connected to the sensor, preferably by a splice. The DRL circuitry in the processing module is designed to modify the power supplied to the auxiliary headlights to reduce the intensity of the auxiliary headlights during daytime running.

Figure 3:
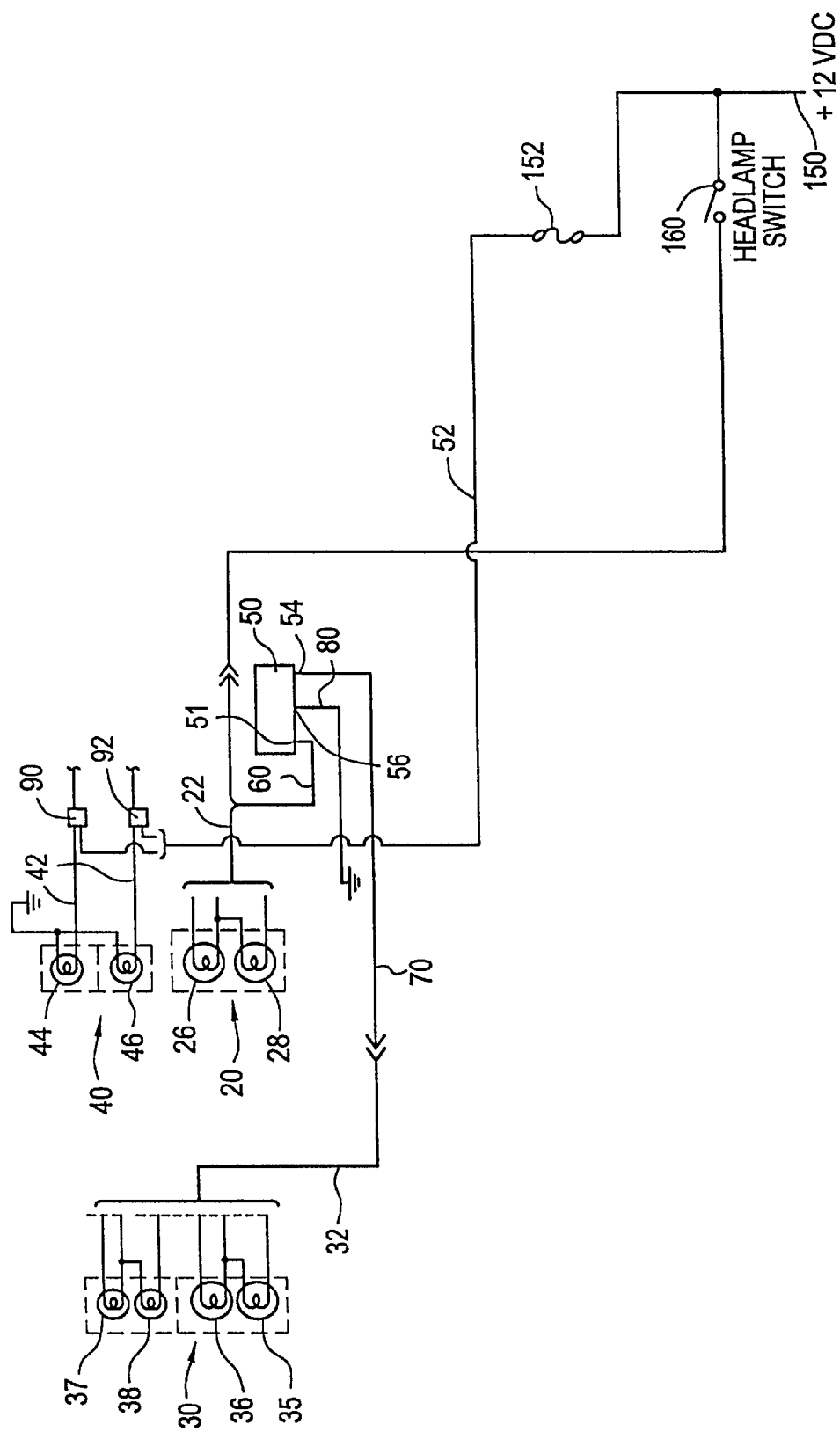
FIG. 3 is a electrical schematic drawing illustrating the circuit of FIG. 2 controlling one vehicle headlight and one auxiliary headlamp.

Referring now to FIG. 3, a more detailed diagram is illustrated as to how the headlights, turn lights, emergency lights, auxiliary lights, and processing module are electrically connected together. Processing module 50 is energized by wire 52 which is connected to a vehicle battery 150. Preferably a fuse 152 is inserted between wire 52 and battery 150 to protect processing module 50 from a power surge. In this arrangement, the process module is continuously energized by battery 150. In an alternate arrangement, not shown, wire 52 is connected in series to the vehicle ignition switch. By connecting in such a fashion, the light system of the vehicle cannot be activated before the ignition switch of the vehicle is engaged. In another embodiment, not shown, the processing module is constantly energized by battery 150 and the processing module receives a signal from the ignition switch when the switch is activated. In this arrangement, the processing module only allows the auxiliary lights to be activated when the ignition switch is activated. As can be appreciated, these two alternate arrangements prevent auxiliary lights 30 from draining the power from the vehicle battery. These alternate arrangements can be very beneficial in that the auxiliary lights 30 typically draw substantially more power than standard headlights, and thus can drain a vehicle's battery in a substantially shorter time than the vehicle's headlights. However, after an operator activates the ignition switch of the vehicle thereby causing the vehicle engine to run, the power generated by the engine is more than sufficient to power the auxiliary lights, thus preventing the power drain of the vehicle battery by the auxiliary lights.

A standard dimmer switch, not shown, is connected in series with headlamp switch 160. The dimmer switch is used to generate a signal to processing module 50, thereby causing the activation of low beam light 26 and high beam light 28 of headlights 20 and low beam light 35 and high beam light 36 of auxiliary lights 30.

Processing module 50 preferably includes circuitry to activate the auxiliary lights 30 and deactivate headlights 20 of a vehicle when the auxiliary light mode is selected. Processing module 50 can include circuitry such that when the ignition switch is deactivated, the processing module deactivates the auxiliary light mode and activates the headlight mode.

Processing module 50 is the primary control unit for the auxiliary multiplex light harness. The processing module includes solid state circuitry to control the operation of the headlights and auxiliary lights. The processing module provides one or more of the following functions:

* Interpret signals from the OEM headlamp wire harness.
* Interpret signals from the OEM turn/emergency lights.
* Interpret signals from a remote and/or wired switch.
* Interpret signals from the DRL sensor.
* Interpret signals resulting from the activation of the ignition switch.
* Interpret signals from the auxiliary lights.
* Disable and/or isolates the OEM headlight system.
* Unite the battery and ground power requirements for the headlights and auxiliary lights.
* Transmit the appropriate data signals and power to the auxiliary lights.
* Transmit the appropriate signals to the headlights.
* Filter out noise in the harness system.
* Convert data for processing and transmission.
* Provide the necessary weather proof harness connectors.

The processing module, once powered up, will continuously monitor the status of the OEM headlight system and switch mode to determine which functions to generate.

Figure 4:
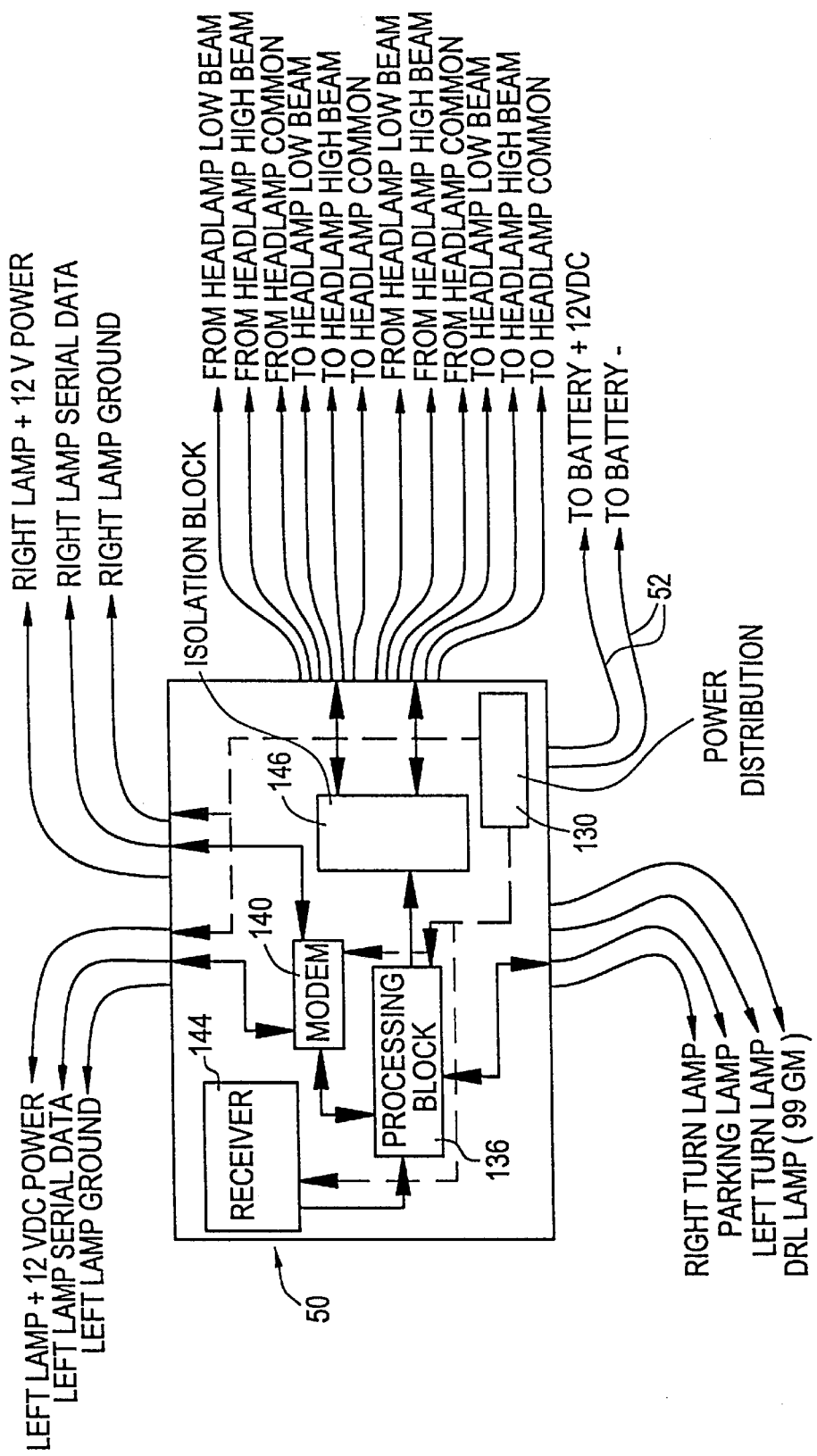
FIG. 4 is a schematic view of the processing module of the present invention.

As illustrated in FIG. 4, processing module 50 includes several circuits that perform one or more functions. Processing module 50 includes a power distribution circuit 130. Power distribution circuit 130 regulates the power received from wire 52, OEM headlight wiring 100, and turn/emergency light wiring 42. The power received from wire 52 is regulated to 5 Vdc for use by one or more other circuits in the processing module. Such circuits include, but are not limited to, the processing block 136, modem 140 and/or remote signal receiver 144. The power distributor also regulates the power, such as 12 Vdc, to the headlights and/or to the auxiliary lights. The power distributor works in conjunction with the relay isolation circuit 146 to control power to the headlights. The power distributor preferably provides filtering and clamping of noise in the auxiliary harness. The relay isolation circuit includes a series of relays and/or MOSFETs control power to the headlights. The control of the relays is regulated by processing block 136.

The processing block is an electronic processor that processes digital and/or analog data. All input and output control from processing module 50 is generated by processing block 136. Processing block 136 can be designed to include permanent and/or software control programming. Processing block can be designed to upload new programming and/or parameter information, and/or download information from memory.

The processing module also includes a receiver 144. Receiver 144 is designed to receive a signal from a wired switch and/or a remote switch. The signal received by receiver 144 is directed to processor block 136. Processor block uses the signal from receiver 144 to preferably determine if the headlights and/or auxiliary lights are to be energized, and/or to execute a test sequence on the auxiliary multiplex light harness. As can be appreciated, the signal can be used for other purposes. For reception of remote signals, receiver 144 is designed to receive a coded radio frequency transmitted by remote switch 80. When the receiver is designed to receive a remote coded signal, the processing block is selected to recognize the coded signal. Alternatively, the receiver 144 can be designed to verify the coded signal from remote switch 80 and transmit a specific signal to processing block 136 based upon the signal received by receiver 144.

Remote switch 80 is illustrated in FIG. 1. The use of remote switch 80 eliminates the need to form an opening between the engine compartment and passenger compartment thus simplifying installation of the auxiliary multiplex light harness. As can be appreciated, the remote switch can be substituted for or used in conjunction with a wired switch. The remote switch is designed to be mounted inside the vehicle cab. The switch is designed to start the process of activating the auxiliary lights once the operator has initiated the command. The switch module is preferably a small device, ergonomically made to be mounted on the steering wheel hub. The activation of the switch initiates circuitry to develop and transmit a RF (radio frequency) signal of sufficient magnitude to be received by the processing module, preferably from a distance of at least 10 feet and more preferably at least 20 feet. The switch is preferably designed to provide multiple signals. These signals can include the activation/deactivation of the auxiliary lights, activation/deactivation of emergency mode, activation of one or more test modes, and the like. The switch provides one or more of the following functions:

* Provide the interface between operator and processing module.
* Transmit the appropriate signal to the processing module.
* Generate one or more unique signals.
* Receive information from the processing module and/or other vehicle components, to indicate activation of one or more components and/or for signal verification purposes.

The switch preferably operates from a battery which can be preferably replaced. In the event that the switch is lost or damaged, the serial lot number located on the processing module would be matched to the new switch. For a hard wire switch, mounting would preferably be on the instrumentation dash of the vehicle. External wiring would preferably include an ignition wire connection and a ground. The signal wire would pass through the bulk head and connected to the processing module.

When a remote switch is used with the auxiliary multiplex light harness, the replacement of a remote switch or processing module in the event of a defective of damaged part would require providing serial lot numbers so that a complimentary remote switch or processing module can be used as a replacement. A multitude of different frequencies for the switch and processing module can be used to significantly reduce the chances that two or more auxiliary multiplex light harnesses having the same coded frequencies are operated in close proximity to one another.

Processing module 50 includes a modem 140. Modem 140 is designed to convert the configuration of information to and from processing block 136. Modem 140 is specifically designed to reconfigure parallel digital information received from the processing block into serial information to be transmitted to the auxiliary lights. In addition, modem 140 can also be designed to reconfigure serial information received from the auxiliary lights into parallel digital information to be sent to processing block 136.

The processing module 50 is designed to receive analog information from the OEM low beam wiring, OEM high beam wiring, OEM parking wiring, OEM turn signal wiring, OEM emergency light wiring and OEM DRL wiring, and to convert such signals into digital information The conversion of the data form can occur in processing block 136 and/or in some secondary circuit in the processing module. The digital information is processed by the processing block 136 to identify conditions such as low beam mode, high beam mode, parking mode, turn signal mode, DRL mode, flash to pass mode, emergency mode, and the like. Once the processing block identifies the mode of operation, the processing block sends information to the power distributor and/or to the auxiliary lights via modem 140 to control the operation of the headlights and/or auxiliary lights. As can be appreciated, the processing module can be connected to other lighting systems of the vehicle to monitor and/or control such operations.

Figure 8:
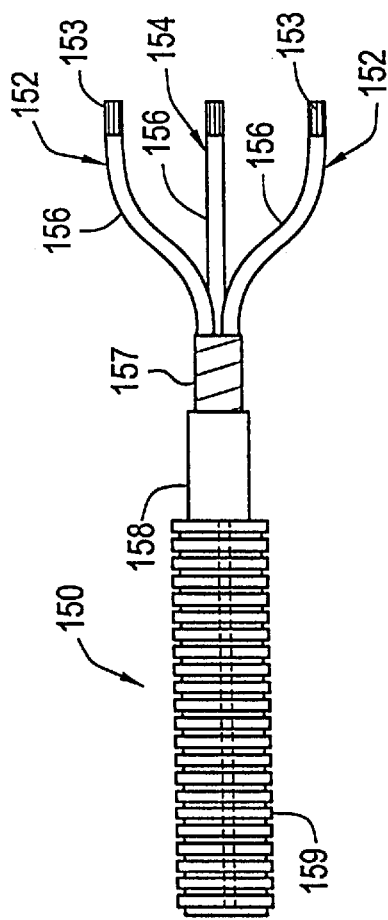
FIG. 8 is a partial side elevation view of the shielded cable with the invention.

Referring now to FIG. 8, the data from processing module 50 is transmitted through a three wire data cable 150 to each auxiliary light. Two of the wires 152 transmit power from processing module 50 to the auxiliary lights. The third wire 154 transmits data information from the processing module 50 to the auxiliary lights. Wires 152 are made of a conducting cable 153 that is preferably a metal such as aluminum, copper or steel. Wire 154 is made of a data transmission cable 155 that is preferably a metal such as aluminum, copper or steel. However, data cable 155 can be a fiber optic cable or other type of data transmission cable. Wires 152 and 154 include a covering 156 to insulate the wires from one another. The covering is preferably a nonconducting rubber or plastic material. Cable 150 includes shielding 157 to isolate the cable from electrical inference and other sources of noise. The shielding material is preferably a metal material; however, it can be some other type of material. The cable 150 includes a covering 158 that covers shielding 157 to protect the shielding from damage. The covering 158 is preferably a nonconducting rubber or plastic material. Cable 150 also includes a protective covering 159 that is placed about covering 158. Protective covering 159 is preferably a resilient flexible material such as a corrugated plastic material. Protective covering 159 preferably is loosely fitted about covering 158 to allow movement of covering 158 within protective covering 159.

Referring now to FIG. 9, there is illustrated a light module 160. Light module 160 is designed to receive data information from processing module 50 and processing such information to control the auxiliary lights. The data information from processing module 50 is sent to the light module 160 via cable 150. A series of data information preferably pulses of digital serial information originating from the processing module 50, make up the protocol for the information being sent to the light module 160. The protocol will include data information to i) legitimize the start of the communication link, ii) provide data for the operation of either the high beam, low beam, park lamp and/or turn lamp of the auxiliary lights, iii) provide data for security checking of the transmission and/or iv) legitimize the close of the communication link. With each transmission of data, the light module processes the information to determine correct information from incorrect information and/or filter out electrical noise so as not to process the incorrect information and/or noise. As can be appreciated, similar verification and security protocols can be used in processing module 50 and light module 160.

The light module provides one or more of the following functions:
* Interpret data signals from the processing module.
* Convert data for processing and/or transmission.
* Filter out noise in the harness system.
* Unite the power requirements for the auxiliary light.
* Transmit data to the processing module.
* Provide the appropriate signal to a switching device to illuminating the auxiliary light.
* Provide the necessary weather proof harness connectors.

The light module includes circuitry that is mechanically fastened and protected from the elements inside each auxiliary light. During manufacturing of a left and a right auxiliary light, the auxiliary light is fabricated so that any left light or any right light can be connected to the auxiliary multiplex light harness. In the event of damage of or loss of a left/right auxiliary light, the light can be replaced with another left/right auxiliary light regardless of the type of processing module 50. In the event that cable 150 is severed and/or needs to be replaced, the auxiliary light can include quick disconnect connectors to remove the cable and replace a new cable that plugs into place on the auxiliary lights and processing module. As can be appreciated, cable 150 can be designed to be permanently affixed to the auxiliary light, thus requiring replacement of the auxiliary light and cable if either are damaged.

As shown in FIG. 9, light module 160 includes several circuits that perform one or more functions. Light module 160 includes a power distribution circuit 162 which regulates the power received from cable 150. The received power is regulated to 5 Vdc for use by one or more circuits in the light module. Such circuits include, but are not limited to, processor 164, modem 166 and light controller 168. The power distributor also regulates the power, such as 12 Vdc, to the lights in the auxiliary lights. The power distributor works in conjunction with light controller 168 to control the power to the lights in the auxiliary lights. The power distributor preferably provides filtering and clamping of noise in the auxiliary harness. The light controller 168 includes relays and/or MOSFETs to direct power to one or more bulb filaments in the auxiliary light. The light controller receives signals from processor 164 to control the relays and MOSFETs to which bulb filaments are activated and deactivated. The processor 164 is an electronic processor which processes digital and/or analog data. All the input and output control in light controller 160 is preferably generated by processor 164; however, some control can be generated by processor module 50. Processor 164 includes permanent and/or software control programming. Processor 160 can be designed to upload and/or download information. Preferably, processor receives parallel information from modem 166. Modem 166 is designed to convert serial information transmitted on cable 150 from processing module 50 into parallel information for processor 164. The modem 166 also can convert information from processor 164 into serial information to transfer such information along cable 150 to processing module 50.

Referring now to FIG. 4, the processing block 136 includes DRL circuitry to operate the auxiliary lights and/or headlight. The DRL circuit causes the isolation block and/or power distributor to reduce the amount of power to the headlights or auxiliary lights for daytime running. The reduction in power is typically between 10 to 50 percent; however, the reduction in power may be some other percentage. Preferably, the power reduction is about 12 to 25 percent. As can be appreciated, part of all of the DRL circuitry can be located in light module 160. The operation of the DRL circuitry preferably operates in a similar manner as the DRL circuitry disclosed in my co-pending U.S. patent application Ser. No. 09/232,398, which is incorporated herein.

Figure 6:
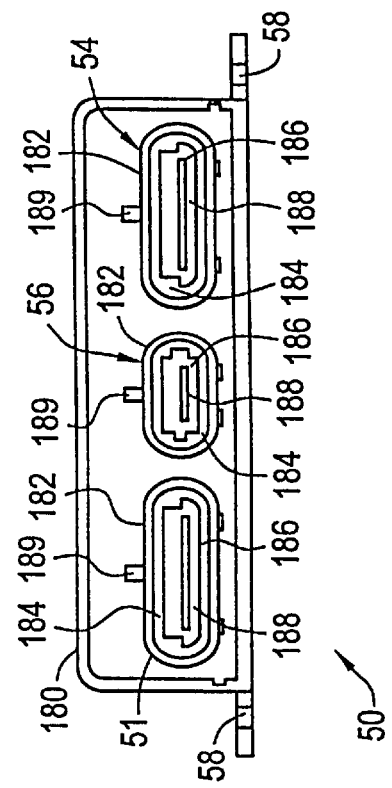
FIG. 6 is a front elevation view of the processing module.
Figure 7:
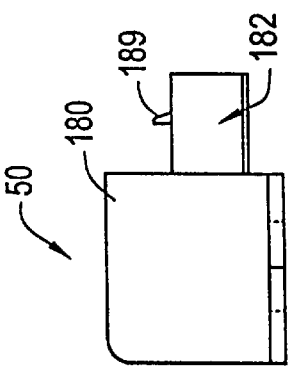
FIG. 7 is a side elevation view of the processing module.

Referring now to FIGS. 1, 2 and 3, auxiliary multiplex light harness 10 has a modular design in that the various components can be connected, replaced, and/or repaired without having to completely dissemble and/or remove the harness from the vehicle. The solid state construction of the processing module simplifies the wiring of the electrical harness, and ensures the desired operation of the headlights of the vehicle and the auxiliary lights of the vehicle occurs during an emergency or some unforeseen circumstance. The reduced number of wires and remote switch simplifies installation of the harness, and simplifies and reduces the time for maintenance and repair of the vehicle, and further reduces unnecessary damage to the vehicle. As can be appreciated, the majority of the wiring of the auxiliary multiplex light harness, the processing module of the auxiliary multiplex light harness, and the switch, if used, can remain in the vehicle from season to season, even though the auxiliary lights are periodically removed, reinstalled and/or replaced on the vehicle. This can be accomplished by simply disconnecting auxiliary light connector 34 from harness auxiliary light wire connector 72 and dismounting the auxiliary light from the vehicle. When the auxiliary light once again is to be reinstalled, connector 34 of the auxiliary light is simply reconnected to the harness auxiliary light connector 72. As previously indicated, processing module 50 includes a mount hole 58 to allow the processing module to be secured in the interior of a vehicle by bolts, screws or the like. The wiring for the electrical harness is preferably secured by ties, clamps and the like to ensure that the wiring is secured in place during the operation of the vehicle. Referring now to FIGS. 5–7, the processing module is housed in a protective housing 180. The housing protects the circuitry from corrosion and from foreign materials that can interfere with the operation of the circuit. Housing 180 includes openings for mounting the processing module in the vehicle.

The auxiliary multiplex light hoarness simplifies the auxiliary light installation by reducing wires and decreasing installation time. The auxiliary multiplex light harness can be adaptable to all vehicles and provide additional features that will minimize the use of adapter kits. The auxiliary multiplex light harness was developed with the primary intent to reduce installation time, reduce installation error and be adaptable to more vehicles.

The auxiliary multiplex light harness includes a switch, one processing module and two auxiliary lights complete with the built in light controllers (left and right sides). The auxiliary multiplex light harness includes the necessary connection wires and connectors. The auxiliary multiplex light harness include two auxiliary light lamp to processing module cables, one processing module to turn/emergency light cable and one processing module to OEM headlight cable. The cable lengths should be from 24 inches to 48 inches to accommodate the processing module being installed in the generally front center of the engine compartment.

The auxiliary multiplex light harness is installed similar to the conventional harness systems. The installation will require that the vehicle OEM headlights be disconnected from the OEM headlamp harness. The appropriate cables kit will then be connected to the OEM headlamp, OEM wire harness and then connected into the appropriate position on the processing module. The three conductor cable exiting the auxiliary lights will be connected into the appropriate position on the processing module. The turn/emergency light cable will be connected into the appropriate position into the processing module. The turn/emergency light cable will require that the wires be connected to each OEM turn signal wire and one wire to the OEM parking lights. In the case of DRL equipped vehicles, one wire will be connected to the DRL lamp wire. The final connection is the power cable in the turn/emergency light cable connected to the +(positive) and −(negative) terminals on the battery.

The switch that is installed in the cab area can be constructed using either radio frequency transmissions (RF) signaling or using one wire through the cab bulk head and into the turn/emergency light cable that connects into the processing module.

In the case of the switch using the RF technology, the switch preferably is similar to an automotive key lock transmitter. The switch is battery operated and can be clipped onto the operators key chain, attached to the instrumentation dash via Velcro or a custom made plastic switch holder, or fastened to the steering wheel hub for easy thumb control operation of the auxiliary lights. The switch would preferably have two buttons. The first button would provide the on/off function of the auxiliary lights. Momentary depression of the button once and the auxiliary lights are selected, and depression of the button again deactivates the auxiliary lights. The second button could be used for auxiliary functions such as providing a test flashing sequence of the headlamps or turn signal lamps. Again, by depressing the button once the sequence will commence, by depressing the button a second time the sequence would stop. The switch functions preferably would be "AND" gated with the parking lights. For example, only when the park light is selected by the operator, then can the test functions be enabled.

In the case of the switch using conventional wiring, the switch could be a small box with two switches built in. The switch could be battery operated or hard wired to the ignition circuit. The switch preferably would be permanently mounted to the instrumentation dash using screws or adhesive tape. One wire would exit the cab area and go through the vehicle bulk head. The switch functions would enable the operation of the auxiliary lights and auxiliary functions such as providing a test flashing sequence of the headlight or turn signal lights.

Another feature of the auxiliary multiplex light harness would be an automated test function. Once the installation of the auxiliary multiplex light harness is complete, the operation of the auxiliary lights can be verified by a step by step operating sequence. One of many such test sequences would require that the operator turn on the vehicle headlights then start the process by depressing both buttons simultaneously on the switch and keeping them depressed for a plurality of seconds. The operator would then have time to walk to the front of the vehicle and witness the self test. The operator would note that the left side vehicle headlight would extinguish (simulating the start of the test), then two seconds later the left auxiliary light low beam would illuminate for two seconds then extinguish, followed by the parking lamp and the turn signal lamp. The left side test would be finalized with the auxiliary lights all off and the headlights back on. Then the right side lights would be tested in the exact same sequence. During the test, the operator would note any bulbs that did not work. This information would then be used to provide corrective action, i.e. the left turn lamp did not work would suggest that either the connection to the turn lamp was done incorrectly by the installer or the bulb has burned out. It is possible to include circuitry in the processing module and/or light module to detect bulb burn out and thus identify exact failure mode.

The integrity of the auxiliary multiplex light harness 10 is maintained by several seals which are utilized at the connections with the processing module and other components of the auxiliary multiplex light harness. The same or similar sealing system as described below can be used to connect the auxiliary lights to cable 150.

Figure 10:
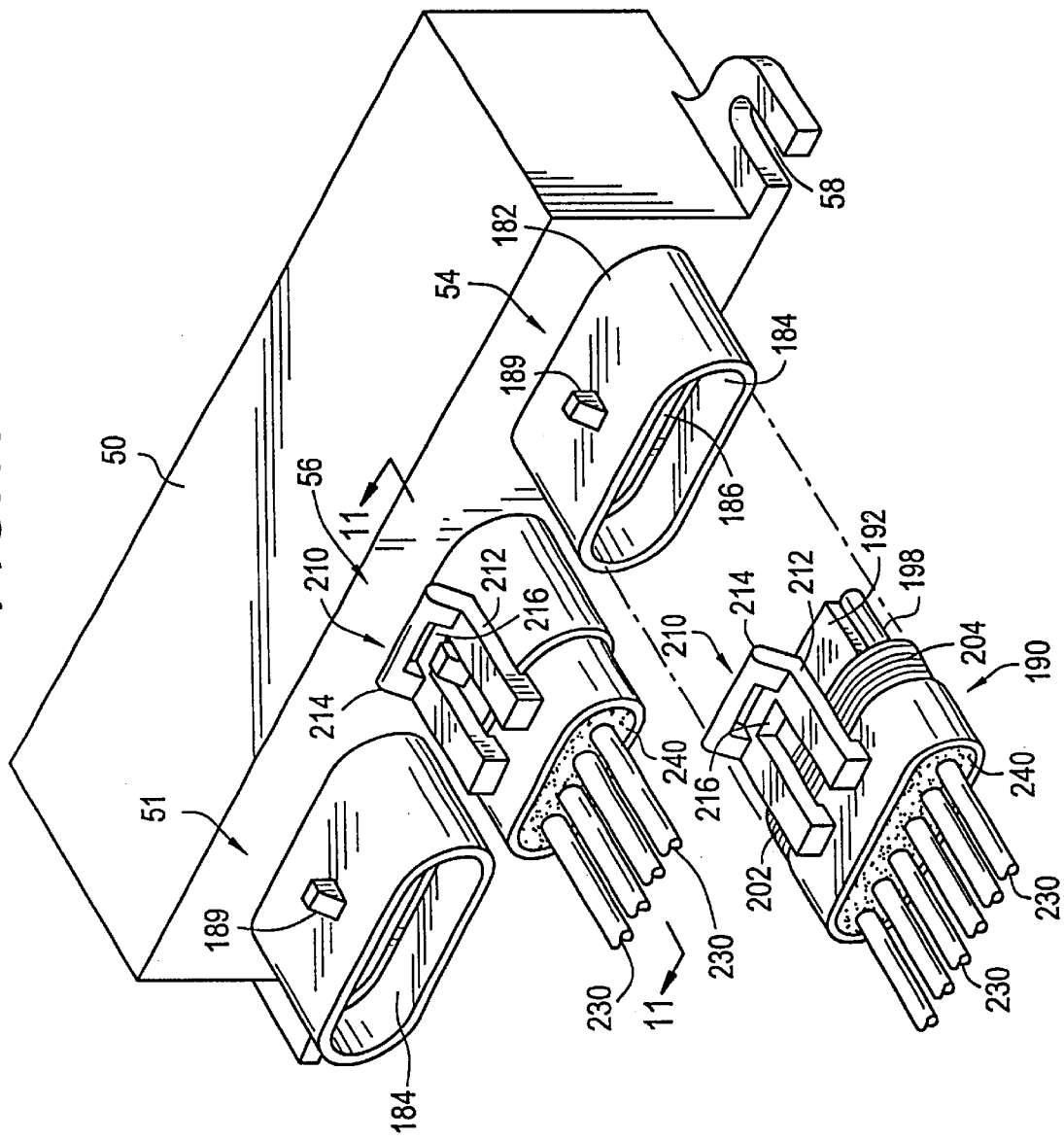
FIG. 10 is a front elevation view of the connectors to a circuit.

Referring now to FIGS. 10 and 11, a seal arrangement is provided for the electrical connection between processing module 50 and harness headlight wiring connectors at the end of wires 60, 70 and 80. Processing module 50 includes three module port seal connectors 51, 54, 56. Module port seal connectors are designed to telescopically receive a port male connector 180. These port connectors are connected to the ends of harness headlight wiring. Each module port connector includes a module casing 182 which is preferably made of a rigid material such as a hard plastic, metal, rubber, fiberglass and the like.

Module casing 182 includes a casing cavity 184. Within casing cavity 184 is a positioning member 186. Within casing cavity 184 is also a plurality of conductor pins 188. A lock tab 189 is positioned on the top of module casing 182.

Each port male connector 190 includes a neck portion 192. At the front of neck portion 192 is a plurality of neck openings 194. Positioned within each neck opening 194 is a conductor socket 196. On the outer surface of neck portion 192 is provided a neck ridge 198. Neck ridge 198 is designed to create a specific cross sectional shape of neck portion 192 such that port male connector 190 can only fit in casing cavity 184 and positioning member 186 in a specific manner so as to ensure the proper connection of port male connector 190 within the modular port connector.

Neck portion 192 also includes a seal surface 200. Positioned on seal surface 200 is a cavity seal 202. Cavity seal 202 includes a plurality of seal ribs 204. Cavity seal 202 is preferably made of a flexible material such as a flexible plastic, rubber or the like to allow seal ribs 204 to compress and/or flex when port male connector 190 is inserted into the modular port connector.

Positioned on the top of port male connectors 190 is a lock latch 210. Lock latch 210 includes two flexible latch arms 212 and a latch handle 214 connected therebetween. Latch handle 214 includes a latch bar 216.

Positioned at the rear of port male connector 190 is a connector rear cavity 220. Positioned in connector rear cavity 220 is a socket cavity 222. The socket lock cavity 224 is provided to secure conductor sockets 196 within socket cavity 222. Extending from connector rear cavity 220 is a plurality of wires 230 which are secured at one end to conductor sockets 196. Wire 230 is sealed within socket cavity 222 by a cavity seal 240. Cavity seal 240 includes a plurality of seal ribs 242. Cavity seal 240 is preferably made of a material similar to the material of cavity seal 202.

As best shown in FIG. 11, when port connector 190 is telescopically received within modular casing 182, conductor sockets 196 in port connector 190 engages the conductor pins 188 within modular casing 182 thereby providing a electrical connection between wire 230 and the electrical circuitry within processing module 50. When port connector 190 is fully inserted into modular casing 182, latch bar 216 on latch handle 212 engages lock tab 189 thereby securing or locking together port connector 190 to port seal connectors 51, 54, 64. Cavity seal 202 and seal 240 inhibit and/or prevent liquid, dust, dirt and the like from contacting conductor sockets 196 and conducting pins 188 thereby ensuring the longevity of the electrical connection. When port connector 190 is to be removed from port seal connectors 51, 54, 56, latch handle 212 is lifted to thereby unlock latch bar 216 from lock tab 189 to allow port connector 190 to be removed from port seal connectors 51, 54, 56.

The invention has been described with reference to preferred and alternate embodiments. Modifications and alterations will become apparent to those skilled in the art upon reading and understanding the detailed discussion of the invention provided for herein. This invention is intended to include all such modifications and alterations insofar as they come within the scope of the present invention.

Having thus described the invention, it is claimed:

1. A light circuit for connecting an auxiliary light to a vehicle headlight system wherein said vehicle headlight system includes at least one headlight and at least one headlight plug which supplies power to said headlight, said light circuit comprising:
   a) a headlight connector to connect to said headlight;
   b) a first power connector to connect to said headlight plug;
   c) an auxiliary light connector to connect to an auxiliary light; and
   d) a processing module to control the amount of power to said headlight and said auxiliary light, said processing module including a microprocessor, said microprocessor, upon receipt of a control signal, at least partially causing said processing module to control at least one function of said headlight and said auxiliary light, said function including an operation selected from the group consisting of an on mode, an off mode, an intensity mode, and combinations thereof.

2. The light circuit as defined in claim 1, wherein said microprocessor at least partially causes said processing module to control the amount of power to at least one of said lights upon receiving at least one control signal from a switch.

3. The light circuit as defined in claim 2, wherein said processing module includes a receiver and said switch generates a radio frequency signal to be received by said receiver.

4. The light circuit as defined in claim 2, wherein said processing module including a signal converter to convert nonserial data into serial data.

5. The light circuit as defined in claim 4, wherein one end of said auxiliary light connector is connected to said processing module, said one end easily attachable and detachable from said processing module.

6. The light circuit as defined in claim 5, wherein said processing module at least periodically monitors at least one electrical signal from the electrical system of the vehicle.

7. The light circuit as defined in claim 6, wherein an auxiliary light connection includes a sealing arrangement.

8. The light circuit as defined in claim 7, wherein said microprocessor at least partially causes said processing module to generate a power reducing signal upon receiving at least one control signal from a daylight detector.

9. The light circuit as defined in claim 8, wherein said microprocessor includes preprogramed control sequences.

10. The light circuit as defined in claim 9, wherein said microprocessor executes a preprogramed test sequence upon receiving a test initiation signal.

11. The light circuit as defined in claim 8, wherein said microprocessor includes programmable software control sequences.

12. The light circuit as defined in claim 8, wherein said microprocessor at least partially causes said processing module to send data signals to at least one auxiliary light to control said auxiliary light.

13. The light circuit as defined in claim 12, wherein said data signals from said processing module control at least one function of at least one light in said auxiliary light, said function including an operation selected from the group consisting of on mode, off mode, intensity mode, and combinations thereof.

14. The light circuit as defined in claim 12, wherein said data signals include signals selected from the group consisting of analog electrical signals, digital electrical signals, and combinations thereof.

15. The light circuit as defined in claim 14, including a cable connected between said processing module and at least one of said auxiliary lights, said cable including a shielded data transmission wire.

16. The light circuit as defined in claim 15, wherein said cable includes three wires, two of said wires transmitting current between said processing module and at least one of said auxiliary lights, one of said wires transmitting data between said processing module and at least one of said auxiliary lights.

17. The light circuit as defined in claim 8, wherein said processing module includes signal verification circuitry, said signal verification circuitry designed to filter noise, verify data signals and combinations thereof.

18. The light circuit as defined in claim 17, wherein said processing module includes a signal modifier to convert between serial and parallel data signals.

19. The light circuit as defined in claim 17, wherein said processing module continuously monitors the status of said headlights.

20. The light circuit as defined in claim 8, including a turn signal connector to connect to a turn signal light of said vehicle, said turn signal connector connected to said control module.

21. The light circuit as defined in claim 8, wherein said power reducing signal causes power to be diverted away from said auxiliary light.

22. The light circuit as defined in claim 21, wherein said processing module includes a pulse width modulator to vary the amount of power to said auxiliary light.

23. The light circuit as defined in claim 8, wherein said processing module causes said power source to be disconnected from said auxiliary light when said daylight signal receiver does not send said control signal to said microprocessor.

24. The light circuit as defined in claim 8, wherein said processing module includes a variable resistor to control the amount of power to said auxiliary light.

25. The light circuit as defined in claim 2, wherein at least one of said auxiliary lights includes a process controller, said process controller controlling at least one light in said auxiliary light upon receiving a data signal from processing module.

26. The light circuit as defined in claim 25, wherein said process controller includes signal verification circuitry, said signal verification circuitry designed to filter noise, verify data signals and combinations thereof.

27. The light circuit as defined in claim 26, wherein said process controller sends at least one data signal to said processing module.

28. The light circuit as defined in claim 1, wherein said processing module including a signal converter to convert nonserial data into serial data.

29. The light circuit as defined in claim 1, wherein one end of said auxiliary light connector is connected to said processing module, said one end easily attachable and detachable from said processing module.

30. The light circuit as defined in claim 1, wherein said processing module at least periodically monitors at least one electrical signal from the electrical system of the vehicle.

31. The light circuit as defined in claim 1, wherein an auxiliary light connector includes a sealing arrangement.

32. The light circuit as defined in claim 1, wherein said microprocessor at least partially causes said processing module to generate a power reducing signal upon receiving at least one control signal from a daylight detector.

33. The light circuit as defined in claim 32, wherein said processing module causes power to be directed from said power source to said auxiliary light.

34. The light circuit as defined in claim 32, wherein said processing module causes said power source from said auxiliary light when said daylight signal receiver does not send said control signal to said microprocessor.

35. The light circuit as defined in claim 8, wherein said microprocessor includes programmed control sequences.

36. The light circuit as defined in claim 1, wherein said microprocessor includes preprogrammable software control sequences.

37. The light circuit as defined in claim 1, wherein said microprocessor executes a preprogramed test sequence upon receiving a test initiation signal.

38. The light circuit as defined in claim 1, wherein said microprocessor at least partially causes said processing module to send data signals to at least one auxiliary light to control said auxiliary light.

39. The light circuit as defined in claim 38, wherein said data signals include signals selected from the group consisting of analog electrical signals, digital electrical signals, and combinations thereof.

40. The light circuit as defined in claim 38, including a cable connected between said processing module and at least one of said auxiliary lights, said cable including a shielded data transmission wire.

41. The light circuit as defined in claim 40, wherein said cable includes three wires, two of said wires transmitting current between said processing module and at least one of said auxiliary lights, one of said wires transmitting data between said processing module and at least one of said auxiliary lights.

42. The light circuit as defined in claim 1, wherein said processing module includes signal verification circuitry, said signal verification circuitry designed to filter noise, verify data signals and combinations thereof.

43. The light circuit as defined in claim 1, wherein said processing module includes a signal modifier to convert between serial and parallel data signals.

44. The light circuit as defined in claim 1, wherein said processing module continuously monitors the status of said headlights.

45. The light circuit as defined in claim 1, wherein at least one of said auxiliary lights includes a process controller, said process controller controlling at least one light in said auxiliary light upon receiving a data signal from processing module.

46. The light circuit as defined in claim 45, wherein said process controller includes signal verification circuitry, said signal verification circuitry designed to filter noise, verify data signals and combinations thereof.

47. The light circuit as defined in claim 45, wherein said process controller sends at least one data signal to said processing module.

48. The light circuit as defined in claim 1, wherein said processing module includes a sealing arrangement, said sealing arrangement adapted to inhibit interference with electrical signals to said processing module, from said processing module, and combinations thereof.

49. The light circuit as defined in claim 48, wherein said sealing arrangement comprising a male connector, a female connector and a flexible seal, said flexible seal positioned at least partially between said male and female connector when said male connector is inserted into said female connector.

50. The light circuit as defined in claim 49, wherein said female connector includes a housing to at least partially telescopically receive a portion of said male connector.

51. The light circuit as defined in claim 49, wherein said flexible seal is positioned on said male connector, said flexible seal substantially surrounding an outer surface of said male connector.

52. The light circuit as defined in claim 51, wherein said flexible seal includes at least one corrugation.

53. The light circuit as defined in claim 48, wherein said male and female connectors include a locking arrangement to secure together said male and female connectors.

54. The light circuit as defined in claim 53, wherein said locking arrangement includes a locking tab on said female connector and a substantially flexible release tab on said male connector.

55. The light circuit as defined in claim 1, including a power modifier to reduce the power from said power source to said auxiliary light.

* * * * *